(12) United States Patent
Sato et al.

(10) Patent No.: US 7,365,037 B2
(45) Date of Patent: Apr. 29, 2008

(54) QUARTZ GLASS HAVING EXCELLENT RESISTANCE AGAINST PLASMA CORROSION AND METHOD FOR PRODUCING THE SAME

(75) Inventors: Tatsuhiro Sato, Fukushima (JP);
Nobumasa Yoshida, Fukushima (JP);
Mamoru Endo, Fukushima (JP)

(73) Assignee: Shin-Etsu Quartz Products Co., Ltd., Tokyo (JP)

( * ) Notice: Subject to any disclaimer, the term of this patent is extended or adjusted under 35 U.S.C. 154(b) by 219 days.

(21) Appl. No.: 11/076,944

(22) Filed: Mar. 11, 2005

(65) Prior Publication Data

US 2005/0272588 A1    Dec. 8, 2005

(30) Foreign Application Priority Data

Mar. 9, 2004    (JP) .............................. 2004-288407

(51) Int. Cl.
*C03C 3/04*    (2006.01)
*C03C 3/095*   (2006.01)
*C03B 20/00*   (2006.01)

(52) U.S. Cl. .............................. 501/54; 501/55; 501/65; 501/66; 501/67; 501/68; 501/69; 501/70; 501/72

(58) Field of Classification Search ................ 501/54, 501/55, 65, 66, 67, 68, 69, 70, 72
See application file for complete search history.

(56) References Cited

U.S. PATENT DOCUMENTS

| | | | |
|---|---|---|---|
| 4,336,048 A * | 6/1982 | van der Steen et al. ...... 65/17.6 |
| 5,246,475 A | 9/1993 | Edagawa et al. | |
| 5,523,650 A | 6/1996 | Terheijden et al. | |
| 5,532,195 A * | 7/1996 | Weiss et al. .................... 501/54 |
| 5,572,091 A * | 11/1996 | Langer et al. ............... 313/636 |
| 6,887,576 B2 * | 5/2005 | Sato et al. ................... 428/432 |
| 2001/0044370 A1 | 11/2001 | Crane et al. | |
| 2004/0037538 A1 | 2/2004 | Schardt et al. | |

FOREIGN PATENT DOCUMENTS

| | | |
|---|---|---|
| EP | 0 643 021 A1 | 3/1995 |
| EP | 0 999 574 A1 | 5/2000 |
| EP | 1 132 349 A1 | 9/2001 |
| JP | 07-085845 A | 3/1995 |
| JP | 09-095771 A | 4/1997 |
| JP | 09-095772 A | 4/1997 |
| JP | 09-202632 A | 8/1997 |
| JP | 10-139480 A | 5/1998 |
| JP | 11-228172 A | 8/1999 |
| JP | 2000-211934 A | 8/2000 |
| JP | 2002-097031 A | 4/2002 |
| JP | 2002-137927 A | 5/2002 |
| JP | 2002-220251 A * | 8/2002 |
| JP | 2002-220257 A | 8/2002 |
| JP | 2002220252 A * | 8/2002 |
| JP | 2002-356345 A | 12/2002 |

OTHER PUBLICATIONS

Machine Translation of Patent Abstracts of Japan: Publication No. 2002-220257.*
International Search Report PCT/ISA/210, Int'l App. No. PCT/JP2005/010605, Jul. 26, 2005 (1 page).
Supplemental European Search Report, Appl. No. 05748813.2-1218, Dec. 27, 2007 (3 pages).

* cited by examiner

*Primary Examiner*—Anthony J. Green
(74) *Attorney, Agent, or Firm*—Rader, Fishman & Grauer PLLC

(57) ABSTRACT

As a jig material to use under plasma reaction for producing semiconductors the present invention provides a quartz glass having resistance against plasma corrosion, particularly corrosion resistance against fluorine-based plasma gases, and which is usable without causing anomalies to silicon wafers; the present invention furthermore provides a quartz glass jig, and a method for producing the same. A quartz glass containing 0.1 to 20 wt % in total of two or more types of metallic elements, said metallic elements comprising at least one type of metallic element selected from Group 3B of the periodic table as a first metallic element and at least one type of metallic element selected from the group consisting of Mg, Ca, Sr, Ba, Sc, Y, Ti, Zr, Hf, lanthanoids, and actinoids as a second metallic element, provided that the maximum concentration of each of the second metallic elements is 1.0 wt % or less.

7 Claims, 2 Drawing Sheets

QUARTZ GLASS HAVING EXCELLENT RESISTANCE AGAINST PLASMA CORROSION AND METHOD FOR PRODUCING THE SAME

BACKGROUND OF THE INVENTION

1. Field of the Invention

The present invention relates to quartz glass and a quartz glass jig for use in producing a semiconductor and having excellent plasma corrosion resistance, and to a method for producing any one of the quartz glass and the quartz glass jig.

2. Description of the Related Art

In such production of the semiconductor, for example, in the production of a semiconductor wafer, in accordance with a recent trend in increasing a diameter thereof, an improvement of processing efficiency is performed by using a plasma reaction apparatus in an etching process and the like. For example, in a process of etching the semiconductor wafer, an etching treatment is performed by using a plasma gas such as a fluorine (F)-based plasma gas.

However, when conventional quartz glass is placed, for example, in an F-based plasma gas atmosphere, $SiO_2$ and the F-based plasma gas are allowed to react with each other on a surface of the quartz glass, to thereby generate $SiF_4$. Since a boiling point of the thus-generated $SiF_4$ is −86° C., it is easily sublimated and, then, the quartz glass is corroded to a great extent causing a reduction in thickness or roughening the surface thereof. Thus, the quartz glass was found to be unsuitable for use as a jig in an atmosphere of the F-based plasma gas.

As described above, in the conventional quartz glass, a serious problem was generated in corrosion resistance, namely, plasma corrosion resistance, in a plasma reaction at the time of producing the semiconductor, particularly, an etching treatment using the F-based plasma gas. Under these circumstances, proposals in which aluminum or an aluminum compound covers a surface of a quartz glass member to improve the plasma corrosion resistance (refer to JP1997-95771A, JP1997-95772A and JP1998-139480A) or another proposal for plasma corrosion resistant glass in which aluminum is allowed to be contained in quartz glass to improve the plasma corrosion resistance (JP1999-228172A) have been made.

According to the present technique, quartz glass was prepared by heat-fusing a quartz glass powder mixed with 5 wt % of alumina powder in vacuum. The plasma corrosion resistance of the thus-prepared quartz glass was investigated. As a result, an etching rate thereof was reduced by 40% to 50% compared with a quartz glass member without containing any dopant at all.

As a reason for that, it is assumed that a boiling point of $AlF_3$ that is generated on the reaction with the F-based plasma gas is 1290° C. that is far higher than that of $SiF_4$. Therefore it is considered that, while a $SiF_4$ portion is corroded to a great extent, sublimation on a surface of an $AlF_3$ portion occurs to a small extent and, accordingly, a difference in an etched quantity becomes large therebetween.

In a same way of thinking, quartz glass containing 0.1 to 20 wt % of a total of two types or more of metallic elements which comprises a first metallic element that is a type belonging to 3B of the periodic table and a second metallic element that is at least one type selected from the group consisting of Zr, Y, lanthanoids and actinoids is also proposed (JP2002-220257A).

The first and second metallic elements contained in the above-described quartz glass each have a higher boiling point in a fluoride form thereof than that of Si, to thereby reduce an etching rate. For example, since a boiling point of $NdF_3$ is 2327° C., when the plasma corrosion resistance is investigated, the etching rate thereof has reduced by 50% to 70% as compared with that of the quartz glass member without containing any dopant at all.

SUMMARY OF THE INVENTION

Although the above described technique can obtain a remarkable effect in improvement of the plasma corrosion resistance, such second metallic elements which have been doped are released with the progress of etching and, then, a portion thereof is adhered on a silicon wafer and the like, to thereby become a factor of a defect.

In order to solve the above-described problems, the present inventors have exerted an intensive study and, as a result, found quartz glass having 0.1 to 20 wt % of a total of the first and second metallic elements, in which, by allowing a maximum concentration of each of the second metallic elements to be 2.0 wt % or less, preferably 1.0 wt % or less, an excellent corrosion resistance is imparted, a concentration of the second metallic elements to be released in an atmosphere is decreased with the progress of the etching in an etching process and, even when the thus-released second metallic element is adhered on the silicon wafer, it is at a level of a detection limit or lower.

Namely, the quartz glass being excellent in plasma corrosion resistance according to the present invention, which is quartz glass containing 0.1 to 20 wt % of a total of two types or more of metallic elements, is characterized in that the metallic elements comprise a first metallic element which is at least one type selected from 3B group of the periodic table and a second metallic element which is at least one type selected from the group consisting of Mg, Ca, Sr, Ba, Sc, Y, Ti, Zr, Hf. lanthanoids and actinoids in which a maximum concentration of each of such second metallic elements is 2.0 wt % or less and, preferably, 1.0 wt % or less.

It is preferable that two types or more of the above-described second metallic elements are contained. Further, it is favorable that a total of the second metallic elements are 2.0 wt % or more and, preferably, 1.0 wt % or more.

It is preferable that the above-described first metallic element is Al and the above-described second metallic element contains at least one type selected from the group consisting of Y, La, Ce, Nd, Sm and Gd.

It is favorable that a blending ratio between the above-described first metallic element (M1) and one type or a total of two types or more of the second metallic elements (M2) is in a relation of (M1)/(M2)=0.1 to 20 in terms of an atomic number ratio.

It is preferable that, in the quartz glass according to the present invention, contents of bubbles and foreign matters are less than 100 $mm^2$ in terms of a projected area per 100 $cm^3$.

A quartz glass jig according to the present invention is characterized in that a metallic element-containing layer comprising quartz glass according to the present invention is formed in a thickness of up to at least 1 mm from a surface thereof.

A first aspect of a method for producing the quartz glass according to the present invention, which is a method for producing quartz glass excellent in plasma corrosion resistance from quartz powder by a Verneuil method using a furnace comprising a burner which supplies raw material powder and a gas, and a rotatable platform, is characterized in that, at the time a quartz glass ingot is prepared by supplying the raw material powder prepared by blending quartz powder with powder of the above-described first and second metallic elements or powder of compounds thereof into the burner and, then, heating, fusing it and, thereafter, dropping the resultant article on the platform, a temperature of a surface of the quartz glass ingot is raised to 1800° C. or higher.

On this occasion, as the platform, a platform comprising, as a raw material, any one of quartz glass doped with a metallic element, graphite, alumina ceramics, zirconia ceramics, ceramics containing alumina and zirconia, and other ceramics, or another platform prepared by combining any one of these raw materials and quartz glass is favorably used.

As for an upper ceiling of the above-described furnace, long sheets each having a strip shape and using any one of alumina ceramics and other ceramics, as a raw material, are aligned and, then, used or a SUS sheet cooled by water is favorably used.

It is also favorable that an electric heater is disposed on a sidewall of the furnace and, then, a side face in a heating area is allowed to be controllably heated by the electric heater.

It is also favorable that, in the Verneuil method using an oxyhydrogen flame, the burner having a structure in which the oxyhydrogen flame forms a focus is used.

It is also favorable that an atmosphere in the heating area in the furnace is in a reducing state containing hydrogen.

In the case of the Verneuil method using the oxyhydrogen flame, it is favorable that a ratio of hydrogen/oxygen to be supplied to a heating atmosphere area in the furnace is 2.5 or more. Even in the case of the Verneuil method using arc plasma, same effect as in the above can be obtained.

A second aspect of the method for producing the quartz glass according to the present invention is characterized in that a solution prepared by dissolving the above-described first and second metallic elements, oxides thereof or compounds thereof and the quartz powder, while mixing with one another, in pure water, an acidic solution, an alkaline solution, or an organic solvent is dried to prepare a formed body and, then, the thus-prepared formed body is heat-fused at 1300° C. or higher in a non-acidic atmosphere and, accordingly, an ingot is prepared.

A third aspect of the method for producing the quartz glass according to the present invention is characterized in that powder prepared by mixing the above described first and second metallic elements, oxides thereof or compounds thereof with quartz powder is packed in a quartz tube and, then, heat-fused at 1300° C. or higher from an outside face of the tube while allowing an inside of the tube to be in a reduced pressure by sucking the air therein, to thereby prepare an ingot.

A fourth aspect of the method for producing the quartz glass according to the present invention is characterized in that a volatile compound gas of the above described first and second metallic elements is diffused in a quartz soot having a hydroxyl group and, then, after subjected to a heating treatment in the temperature range of from 200° C. to 1100° C., heat-fused at 1300° C. or higher in a non-acidic atmosphere, to thereby prepare an ingot.

A fifth aspect of the method for producing the quartz glass according to the present invention is characterized in that a quartz soot is dipped in a solution prepared by mix-dissolving the above described first and second metallic elements or compounds thereof which are dissolvable in pure water, an acidic solution, an alkaline solution, or an organic solvent, in the pure water, the acidic solution, the alkaline solution, or the organic solvent, dried and, then, heat-fused at a temperature of 1300° C. or higher in a non-acidic atmosphere.

In the first to fifth aspects of the method for producing the quartz glass according to the present invention, it is preferable that the thus-prepared quartz glass ingot is heat-formed at a temperature of 1300° C. or higher under a pressure of 2 kg/cm$^2$ or higher in an inert gas atmosphere.

A method for preparing a quartz glass jig according to the present invention is characterized in that a solution prepared by mix-dissolving any of the first and second metallic elements, oxides thereof or compounds thereof which are dissolvable in pure water, an acidic solution, an alkaline solution, or an organic solvent, in the pure water, the acidic solution, the alkaline solution, or the organic solvent is coated on a surface of a previously prepared quartz glass jig and, then, the thus-coated surface is heat-fused.

In the method for producing the quartz glass jig according to the present invention, it is preferable that the thus-produced quartz glass jig is heat-formed at a temperature of 1300° C. or higher under a pressure of 2 kg/cm$^2$ or higher in an inert gas atmosphere.

The quartz glass and the quartz glass jig according to the present invention are, as a jig material for plasma reaction for use in production of a semiconductor, excellent in plasma corrosion resistance, particularly, the corrosion resistance against an F-based plasma gas and have an effect such that they can be used without causing any abnormal feature on a silicon wafer. Further, the method according to the present invention has an advantage in that the quartz glass and the quartz glass jig excellent in the plasma corrosion resistance can efficiently be produced.

DETAILED DESCRIPTION OF THE INVENTION

Figure 1:
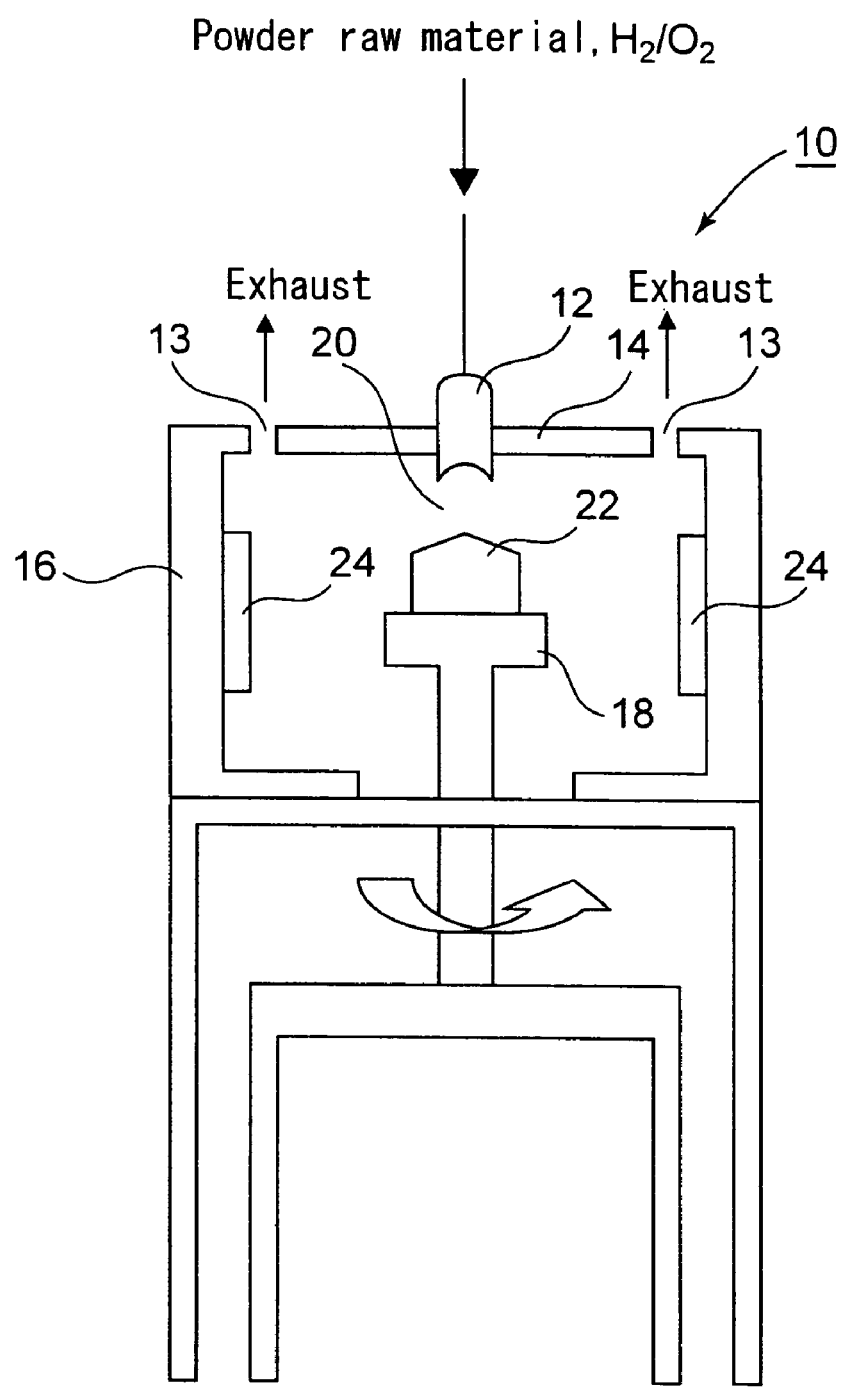
FIG. 1 is a schematic explanation view showing an example of an apparatus employed in a method of producing a quartz glass according to the invention.

Hereinafter, embodiments according to the present invention will be described with reference to the accompanying drawings; however, they are representative and shown only for illustrative purposes and it goes without saying that various modifications and alterations can be made without departing from the scope of the general inventive concept of the present invention.

Quartz glass according to the present invention, which is quartz glass containing 0.1 to 20 wt % of a total of two types or more of metallic elements, is characterized in that the metallic elements comprise a first metallic element which is at least one type selected from 3B group of the periodic table and a second metallic element which is at least one type selected from the group consisting of Mg, Ca, Sr, Ba, Sc, Y, Ti, Zr, Hf, lanthanoids and actinoids in which a maximum concentration of each of such second metallic elements is 2.0 wt % or less and, preferably, 1.0 wt % or less.

Although an entire concentration of the above-described metallic elements to be contained is 0.1 to 20 wt %, when it is less than 0.1 wt %, there is no improvement of etching resistance, while, when it is more than 20 wt %, bubbles are generated to a great extent and, accordingly, the quartz glass can no more be used as a glass body. From the standpoint of the improvement of corrosion resistance, the entire concentration of the metallic elements to be contained is preferably 1 to 20 wt % and, more preferably, 2 to 20 wt %.

When Al which is the first metallic element is contained together with the second metallic element, Al is incorporated in a quartz network to cause a negative charge and, then, the thus-caused negative charge and the second metallic element which holds a positive charge attract with each other to alleviate charges therebetween and, as a result, metallic elements are suppressed from being solidified as oxides thereof. As for the first metallic elements which each tend to have a negative charge in a same manner as in Al, a metallic element belonging to 3B of the periodic table can be selected; however, since Al is an element which has no problem in a production process of a semiconductor, Al is most suitable as the first metallic element. Further, as for the second metallic elements, since Y, La, Ce, Nd, Sm and Gd are high in the above-described effect, easily handled, at low cost and easily available in the market, they are favorable.

It is preferable that a blending ratio between the above-described first metallic element (M1) and one type or a total of two types or more of the second metallic elements (M2) is in a relation of (M1)/(M2)=0.1 to 20 in terms of atomic number ratio. When this ratio is less than 0.1, the above-described effect of alleviation cannot be obtained and turbidity is generated, while, when it is more than 20, charge stability is collapsed, to thereby generate bubbles and foreign matters in a transparent glass body to a great extent.

When the glass body produced while satisfying above-described conditions is used in a dry-etching process, an etched substance is scattered in a gaseous state in an etching chamber and, then, a portion of the etched substance is adhered on an Si wafer; therefore, a gas cleaning of the etching chamber and a liquid cleaning of the Si wafer are periodically performed every about 100 hours. On this occasion, when the second metallic element on the Si wafer is equal to or less than the detection limit, there causes no problem in a succeeding production process of a semiconductor device. As a result of a study executed by the present inventors, it has been found that, when the quartz jig placed in the etching chamber was doped with more than 2.0 wt % of each of the second metallic elements, although etching corrosion resistance was improved, a large -amount of second metal impurities were, after being scattered, deposited on the Si wafer and was detected even after the Si wafer was subjected to cleaning, while, when it was doped with 2.0 wt % or less thereof, the second metal impurities were no more detected on the Si wafter, after the Si wafer was subjected to cleaning. Measurements were performed by a fluorescent X ray.

Namely, by allowing a maximum concentration of each of the second metallic elements to be 2.0 wt % or less and, preferably, 1.0 wt % or less, a concentration of the second metallic elements to be released in the atmosphere with the progress of etching is reduced and, then, even when they are adhered on the silicon wafer, the concentration thereof becomes at a level of the detection limit or lower.

However, when a stronger etching corrosion resistance is required, since the etching corrosion resistance and a concentration of a doped metal are in a proportional relation with each other, a doping concentration of 2.0 wt % or more becomes necessary. In order to solve both the problem of metallic element detection on the Si wafer and the etching corrosion resistance, the second metallic elements are allowed to be 2 types or more and, while restricting a concentration of each of them to be 2.0 wt % or less and, preferably, 1.0 wt % or less, a concentration of an entire amount thereof is allowed to be 2.0 wt % or more and, preferably, 1.0 wt % or more and, as a result, it has become possible to assure non-detection of each of the metallic elements and a sufficient effect of the etching corrosion resistance.

When a doped quartz material as having such excellent etching corrosion resistance as described above is used as a quartz jig, an entire body of the jig is not necessarily made of the doped quartz material. By forming a metallic element-containing layer which contains 0.1 to 20 wt % of the above-described metallic elements in a thickness of up to at least 1 mm from the surface thereof, a portion of the doped quartz material is present on the surface of the jig at least in an actual production process of etching.

Figure 2:
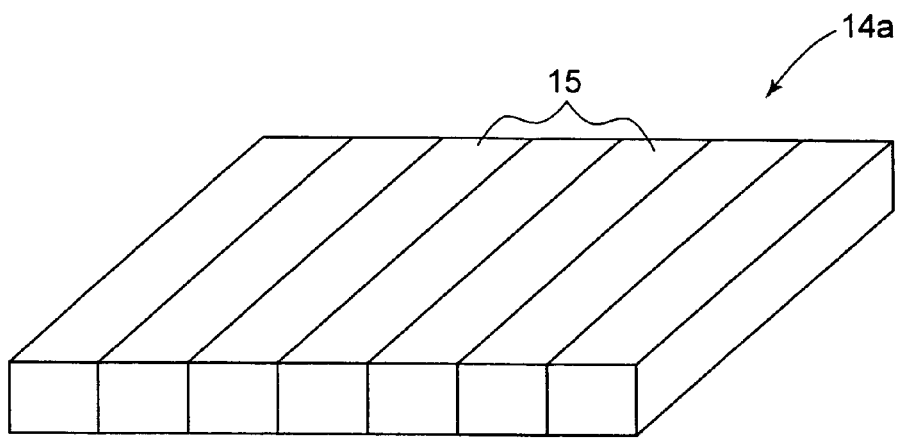
FIG. 2 is a schematic perspective view showing an example of an upper ceiling of a furnace.
Figure 3:
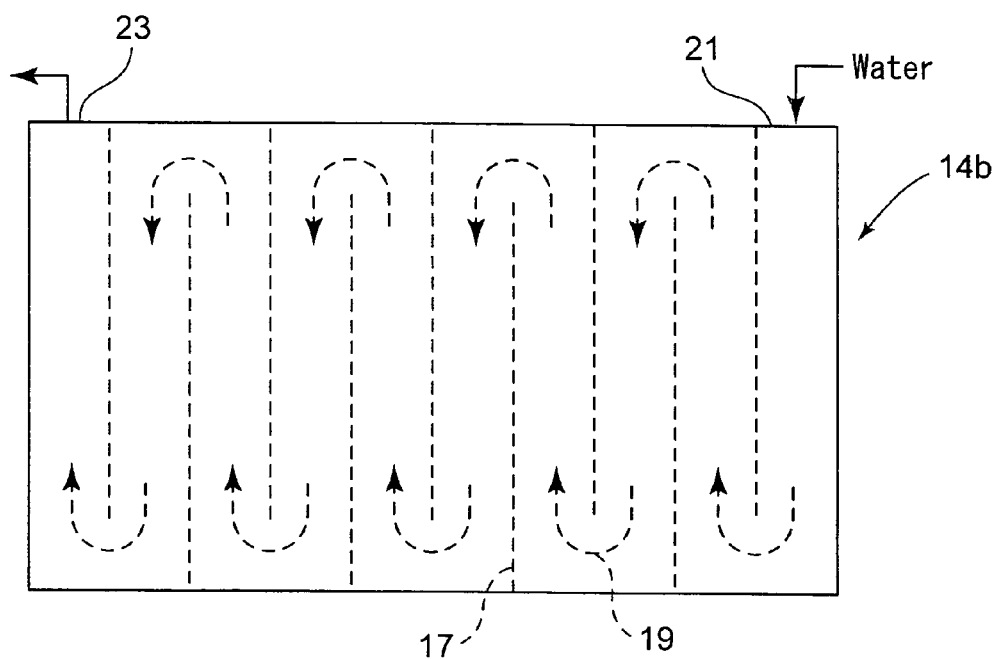
FIG. 3 is a top view showing another example of an upper ceiling of a furnace.

A first aspect of a production method according to the present invention is a method for producing quartz glass excellent in plasma corrosion resistance from quartz powder by the Verneuil method. The first aspect of the method according to the present invention will be described below with reference to FIGS. 1 to 3. FIG. 1 is a schematic explanatory diagram showing an example of an apparatus by the Verneuil method to be used in a method for producing quartz glass according to the present invention. FIG. 2 is a schematic perspective explanatory diagram showing an example of an upper ceiling of a furnace. FIG. 3 is a top view of another example of the upper ceiling of the furnace.

In FIG. 1, 10 denotes a furnace which comprises an upper ceiling 14 on which a burner 12 that supplies raw material powder and a gas is disposed, a sidewall 16 and a rotatable platform 18. Raw material powder which is mixed powder of powder of the above-described first and second metallic elements or compounds thereof and quartz power is supplied to the burner 12 and, then, heat-fused and dropped on the rotating platform 18, to thereby prepare a quartz glass ingot 22. On this occasion, by raising a temperature of a surface of the quarts glass ingot 22 to 1800° C. or higher, the quartz powder is sufficiently fuse-liquefied and the metallic element powder can sufficiently be diffused in the thus-fuse-liquefied quartz powder. Further, In FIG. 1, an exhaust port 13 is disposed in an upper portion of the furnace; however, a position of the exhaust port is not particularly limited according to the present invention and the exhaust port may be disposed in a sidewall or a lower portion of the furnace. Still further, a shape or the like of the furnace is not particularly limited and a known furnace to be used in the Verneuil method can widely be used.

As for the platform 18 on which the quartz powder mixed with the metallic elements is dropped, it is favorable that a platform which uses, as a raw material, any one of quartz glass doped with a metallic element, graphite, alumina ceramics, zirconia ceramics, ceramics containing alumina or zirconia and other ceramics than the above-described ceramics is used or another platform which is prepared by using any one of these raw materials and quartz glass in combinations is used. This is because, since the platform 18 is severely heated for a long time and tends to be deformed or broken, it is indispensable that the platform 18 is excellent in heat resistance and strength.

FIG. 2 is a perspective schematic explanatory diagram showing an example of an upper ceiling 14 disposed in an upper portion of a heating area 20. In FIG. 2, the upper ceiling 14a is formed by aligning a plurality of long sheets 15 each having a strip shape in parallel. FIG. 3 is a top view of another example of the upper ceiling 14. In FIG. 3, the upper ceiling 14b, which is made of a stainless steel sheet (SUS sheet) provided with a baffle plate 17 inside, is cooled by allowing water to be flowed in from a water inlet 21, flowed along a water channel 19 and, then, discharged from a water outlet 23.

As for the upper ceiling 14 of the heating area 20, it is favorable that, as shown in FIG. 2, long sheets each having a strip shape in which alumina ceramics or other ceramics than the alumina ceramics are used as raw materials are used after being aligned or, as shown in FIG. 3, the SUS sheet cooled by water is used. The upper ceiling portion tends to be broken in a same manner as in the platform and, even when such breakage is minute, a foreign matter caused by the breakage is scattered and dropped on the ingot 22, to thereby cause a bubble. In order to prevent the bubble from being generated, it is necessary to allow not only the raw material itself but also the shape thereof to be such material and shape which are hard to cause the minute breakage and, the long sheet having a strip shape is effective. Further, when the SUS sheet cooled by water is used, the minute breakage is not generated at all and, therefore, it is extremely effective means.

As shown in FIG. 1, it is also favorable that an electric heater 24 is disposed on the sidewall 16 and, then, a side face of the heating area 20 is allowed to be controllably heated by the electric heater 24. This is because, in a process of preparing the quartz ingot 22, by heating the side face, an oxyhydrogen flame to be used can be small in quantity and, then, heat loads to the furnace upper ceiling 14, the sidewall 16 and the platform 18 can be reduced, to thereby remarkably stabilize a production state. Further, after the quartz ingot 22 is prepared, when the oxyhydrogen flame is extinguished, a temperature of the heating area is sharply decreased, and the quartz glass is also quenched and distorted, to thereby generate a crack inside the glass body. For this account, it is extremely effective in preventing the crack from being generated that, after such extinguishment, the side face of the furnace is heated by the electric heater to allow the quartz glass to be gradually cooled.

In the Verneuil method using the oxyhydrogen flame, it is also favorable to use the burner having a structure in which the oxyhydrogen flame forms a focus. This is because a burning energy of an oxyhydrogen gas can be concentrated and, then, mixed powder of the metallic elements and quartz glass powder to be dropped can be exposed to such concentrated burning energy and, for this account, a heating effect becomes extremely large.

It is favorable that an atmosphere of the heating area 20 is in a reducing state containing hydrogen. This is because, when the metallic element is the oxide thereof, a reductive reaction of the oxide is progressed and, then, the metallic element becomes easily fused in the quartz glass. Further, remaining oxygen that causes bubble formation is changed into $H_2O$ and, then, removed.

In the above-described Verneuil method, when the oxyhydrogen flame is used as a heating source, by allowing a ratio of hydrogen/oxygen to be supplied from the burner 12 into a heating atmosphere area 20 to be 2.5 or more, the reductive reaction of the oxide is progressed and, then, the metallic element becomes easily fused in the quartz glass. When the Verneuil method is used, arc plasma may be used as the heating source. Even with such arc heating source, it is effective in a same manner as in the above to maintain an atmosphere in a reducing state.

A second aspect is a production method which is characterized in that a solution prepared by dissolving the above described first and second metallic elements, oxides thereof or compounds thereof with quartz powder, while mixing with one another, in pure water, an acidic solution, an alkaline solution, or an organic solvent is dried to prepare a formed body and, then, the thus-prepared formed body is heat-fused at 1300° C. or higher in a non-acidic atmosphere, to thereby prepare an ingot.

A third aspect is a production method which is characterized in that powder prepared by mixing the above described first and second metallic elements, oxides thereof or compounds thereof with quartz powder is packed in a quartz tube and, then, heat-fused at 1300° C. or higher from an outside face of the tube while allowing an inside of the tube to be in a reduced pressure by sucking the air therein, to thereby prepare an ingot.

A fourth aspect is a production method in which a volatile compound gas of the above described first and second metallic elements is diffused in a quartz soot having a hydroxide group and, then, after subjected to a heating treatment in the temperature range of from 200° C. to 1100° C., heat-fused at 1300° C. or higher in a non-acidic atmosphere, to thereby prepare an ingot.

A fifth aspect is a production method which is characterized in that a quartz soot is dipped in a solution prepared by mix-dissolving the above-described first and second metallic elements or compounds thereof which are dissolvable in pure water, an acidic solution, an alkaline solution, or an organic solvent, in the pure water, the acidic solution, the alkaline solution, or the organic solvent, dried and, then, heat-fused at a temperature of 1300° C. or higher in a non-acidic atmosphere, to thereby prepare an ingot.

A sixth aspect is a method for producing a quartz glass jig by applying a solution prepared by mix-dissolving the above described first and second metallic elements, oxides thereof or compounds thereof which are dissolvable in pure water, an acidic solution, an alkaline solution, or an organic solvent, in pure water, an acidic solution, an alkaline solution or an organic solvent on a surface of a previously prepared quartz glass jig and, then, heat-fusing the surface.

Although there is a case in which bubbles each having a size of about 1.0 mmφ sometimes remain partially in such doped quartz glass member as produced in the above-described aspects, the bubbles can be compress-removed by heat-forming the doped quartz glass member at a temperature of 1300° C. or higher under a pressure of 2 kg/cm$^2$ or higher in an inert gas atmosphere. The inert gas is favorably an Ar gas and a temperature of the heat forming is favorably 1450° C. or higher.

In such plasma corrosion resistant quartz glass ingot as prepared in the above-described aspects, contents of the bubbles and the foreign matters are less than 100 mm$^2$ in terms of a projected area per 100 cm$^3$.

As has been described above, according to the present invention, the bubbles and the foreign matters which will cause a problem at the time when the glass body is used for a semiconductor industry are not found in the glass body and, accordingly, the quartz glass which has improved in the plasma corrosion resistance and has decreased in the etching rate by 50% or more as compared with natural or synthetic quartz glass can be obtained and, also, the metal impurities at such a level as at which a problem is caused are not found on the silicon wafer all through the etching process.

The present invention is described below by way of examples, but it goes without saying that the following examples are given to illustrate the present invention and should not be interpreted as limiting it in any way.

EXAMPLE 1

Powder prepared by mixing 27120 g of quartz particles, 1440 g of $Al_2O_3$ powder, 240 g of $Y_2O_3$ powder, 240 g of $CeO_2$ powder, 240 g of $Nd_2O_3$ powder, 240 g of $La_2O_3$ powder, 240 g of $Gd_2O_3$ powder and 240 g of $Sm_2O_3$ powder by a ball mill made of quartz glass was fused and dropped at a rate of 50 g/min on a target of 300 mmφ×100 mmt rotating at a rate of 1 rpm in an oxyhydrogen flame which used a burner having a focusing distance of 200 mm, to thereby prepare quartz ingot of 200 mmφ×400 mm. The target comprised quartz glass in a thickness of up to 40 mmt from the surface and graphite in the subsequent lower portion of from 40 to 100 mmt. Gas conditions employed were set as that $H_2$ was 300 L/min; and $O_2$ was 100 L/min. An upper ceiling in a heating area was fabricated by aligning alumina sheets each having a strip shape of 40×6×1000 in sizes. During such preparation of the ingot, a side-face heating was performed by a rod-shaped electric heater disposed on a side face of the ingot and, after the flame was distinguished, the ingot was gradually cooled down to 800° C. consuming 4 hours by gradually weakening an intensity of the heating by the heater. The ingot thus prepared was placed in a heating treatment furnace and, then, formed by being held for one hour at 1800° C. under a pressure of 3 kg/cm$^2$ in an Ar atmosphere, to thereby prepare a formed body of 500 mmφ×60 mm.

When the bubbles and foreign matters inside the ingot were checked by an optical visual observation method, amounts of the bubbles and foreign matters contained were 50 mm$^2$ in terms of a projected area per 100 cm$^3$. Further, an internal transmission of visible light was 70%/cm. A sample was cut out from the glass formed body thus obtained and, then, when a concentration of the metallic element in the glass body was measured by using a fluorescent X ray, results as shown in Table 1 were obtained.

Further, a jig having a ring shape of outer diameter: 400 mmφ× inner diameter: 370 mmφ×200 mmt was cut out from the glass formed body and, then, machined.

A silicon wafer was set in an inner portion of the thus-cut out jig, set in an etching apparatus and, then, while a plasma gas comprising $CF_4+O_2$ (20%) was flown at a rate of 50 sccm in a one-time-use manner, was subjected to an etching test under conditions of 30 mtorr, 1 kw and 100 hours. An etching rate was calculated based on the change in thickness before and after the test, to thereby obtain a result of 30 nm/min. Further, when an analysis of the impurities on the silicon wafer was executed by using the fluorescent X ray, every metallic impurity except Al was less than 1×10$^8$ atoms/cm$^2$, which was not problematic. The results are shown in Table 1.

TABLE 1

| | First metallic element (wt %) | Second metallic element (wt %) | M1/M2 Atomic number ratio | Ingot turbidity point | Ingot bubble | Etching rate (nm/min) | Metallic impurities (atoms/cm$^2$) |
|---|---|---|---|---|---|---|---|
| Example 1 | Al (4.8) | Y (0.8), Nd (0.8), Sm (0.8), Ce (0.8), La (0.8), Gd (0.8) | 2.6 | ○ | ○ | 30 | <1 × 10$^8$ |
| Example 2 | Al (4.8) | Y (0.4), Nd (0.4), Sm (0.4), Ce (0.4), La (0.4), Gd (0.4) | 5.2 | ○ | ○ | 40 | <1 × 10$^8$ |
| Example 3 | Al (4.8) | Y (0.8), Nd (0.8), Sm (0.8) | 5.7 | ○ | ○ | 40 | <1 × 10$^8$ |
| Example 4 | Al (4.8) | Y (0.8) | 13.4 | ○ | ○ | 50 | <1 × 10$^8$ |
| Comparative Example 1 | — | — | — | ○ | ○ | 120 | <1 × 10$^8$ |
| Comparative Example 2 | Al (4.8) | Y (2.4) | 4.5 | ○ | ○ | 40 | 1 × 10$^{15}$ |
| Experimental Example 1 | Al (0.16) | Y (0.8), Nd (0.8), Sm (0.8), Ce (0.8), La (0.8), Gd (0.8) | 0.09 | X | ○ | 30 | <1 × 10$^8$ |
| Experimental Example 2 | Al (4.8) | Y (0.8), Nd (0.8), Sm (0.8), Ce (0.8), La (0.8), Gd (0.8) | 2.6 | X | ○ | 30 | <1 × 10$^8$ |
| Experimental Example 3 | Al (4.8) | Y (0.8), Nd (0.8), Sm (0.8), Ce (0.8), La (0.8), Gd (0.8) | 2.6 | ○ | X | 30 | <1 × 10$^8$ |

EXAMPLE 2

Same treatments were performed as in Example 1 except for doping 27840 g of quartz particles, 1440 g of $Al_2O_3$ powder, 120 g of $Y_2O_3$ powder, 120 g of $CeO_2$ powder, 120 g of $Nd_2O_3$ powder, 120 g of $La_2O_3$ powder, 120 g of $Gd_2O_3$ powder and 120 g of $Sm_2O_3$ powder, to thereby obtain results as shown in Table 1. The etching rate was 40 nm/min.

EXAMPLE 3

Same treatments were performed as in Example 1 except for doping 27840 g of quartz particles, 1440 g of $Al_2O_3$ powder, 240 g of $Y_2O_3$ powder, 240 g of $Nd_2O_3$ powder and 240 g of $Sm_2O_3$ powder, to thereby obtain results as shown in Table 1. The etching rate was 40 nm/min.

EXAMPLE 4

Same treatments were performed as in Example 1 except for doping 28320 g of quartz particles, 1440 g of $Al_2O_3$ powder and 240 g of $Y_2O_3$ powder, to thereby obtain results as shown in Table 1. The etching rate was 50 nm/min.

EXAMPLE 5

Same treatments were performed as in Example 1 except for using arc plasma as a heating source of the Verneuil method, to thereby obtain similar evaluation results to those in Example 1.

EXAMPLE 6

Same treatments were performed as in Example 1 except that a solution prepared by mix-dissolving quartz particles and a metallic oxide to be doped in a starting solution was dried and, accordingly, a formed body was prepared, to thereby obtain a quartz glass formed body. When a similar sample to that in Example 1 was prepared and, then, each evaluation was performed on the thus-prepared sample, similar evaluation results to those in Example 1 were obtained.

EXAMPLE 7

Same treatments were performed as in Example 1 except that powder prepared by mixing quartz particles and a metallic oxide to be dopes was packed in a quartz tube and, then, heated from an outer face of the tube to be fused while allowing the inside of the tube to be in a reduced pressure by sucking the air therein and, accordingly, an ingot was prepared, to thereby obtain a quartz glass formed body. When a similar sample to that in Example 1 was prepared and, then, each evaluation was performed on the thus-prepared sample, similar evaluation results to those in Example 1 were obtained.

EXAMPLE 8

Same treatments were performed as in Example 1 except that a volatile gaseous compound of a metal to be doped was allowed to be diffused in a quartz soot having a hydroxyl group, subjected to a heating treatment at 600° C. and, then, heat-fused and, accordingly, an ingot was prepared, to thereby obtain a quartz glass formed body. When a similar sample to that in Example 1 was prepared and, then, each evaluation was performed on the thus-prepared sample, similar evaluation results to those in Example 1 were obtained.

EXAMPLE 9

Same treatments were performed as in Example 1 except that a quartz soot body was dipped in a solution prepared by mix-dissolving a metallic compound to be doped, dried and, then, heat-fused, to thereby obtain a quartz glass formed body. When a similar sample to that in Example 1 was prepared and, then, each evaluation was performed on the thus-prepared sample, similar evaluation results to those in Example 1 were obtained.

EXAMPLE 10

A solution prepared by mix-dissolving a metallic compound to be doped was applied on a surface of a quartz glass jig and, then, the surface was heat-fused, to thereby produce a quartz glass jig. Further, the metallic compound to be doped was same as in Example 1. When a plasma etching test was performed on the thus-produced quartz glass jig in a same manner as in Example 1, an etching rate was 30 nm/min and metallic impurities except for Al were not found on a silicon wafer.

EXAMPLES 11 to 14

Same treatments were performed as in Example 1 except for using, as a metallic compound to be doped, $B_2O_3$ powder, $Ga_2O_3$ powder, $In_2O_3$ powder or $Tl_2O_3$ power in place of $Al_2O_3$ powder, to thereby obtain a quartz glass formed body. When a similar sample to that in Example 1 was prepared and, then, each evaluation was performed on the thus-prepared sample, similar evaluation results to those in Example 1 were obtained.

EXAMPLES 15 to 26

Same treatments were performed as in Example 3 except for using, as a metallic compound to be doped, MgO powder, CaO powder, SrO powder, BaO powder, $Sc_2O_3$ powder, $La_2O_3$ powder, $CeO_2$ powder, $Gd_2O_3$ powder, $Am_2O_3$ powder, $TiO_2$ powder, $ZrO_2$ powder or $HfO_2$ powder in place of $Sm_2O_3$ powder, to thereby obtain a quartz glass formed body. When a similar sample to that in Example 3 was prepared and, then, each evaluation was performed on the thus-prepared sample, similar evaluation results to those in Example 3 were obtained.

COMPARATIVE EXAMPLE 1

30000 g of quartz particles was filled in a carbon casting mold and, then, subjected to a heating treatment at 1,800° C. for one hour in a vacuum atmosphere, to thereby prepare a transparent glass body of 500 mm$\phi$×65 mm. Further, when a similar sample to that in Example 1 was prepared and subjected to a plasma etching test, it was found that an etching rate was 120 nm/min. Other evaluation results than the etching rate were same as in Example 1.

COMPARATIVE EXAMPLE 2

A sample was prepared in a similar manner to that in Example 3 except for doping 27840 g of quartz particles, 1440 g of $Al_2O_3$ powder and 720 g of $Y_2O_3$ powder and, then, subjected to evaluations. The etching rate was 45 nm/min. As a result of an analysis of impurities on a silicon wafer, Y was detected as being $1\times10^{16}$ atoms/cm$^2$, which was problematic.

EXPERIMENTAL EXAMPLE 1

28510 g of quartz particles, 50 g of $Al_2O_3$ powder, 240 g of $Y_2O_3$ powder, 240 g of $CeO_2$ powder, 240 g of $Nd_2O_3$ powder, 240 g of $La_2O_3$ powder, 240 g of $Gd_2O_3$ powder and 240 g of $Sm_2O_3$ powder were mixed, fused and dropped at a rate of 50 g/min on a target ingot rotating at a rate of 1 rpm in an oxyhydrogen flame, to thereby prepare a quartz ingot of 200 mm$\phi$×400 mm. Gas conditions employed were set as that $H_2$ was 300 L/min; and $O_2$ was 100 L/min. The thus-prepared ingot was placed in a heating treatment furnace and, then, formed to be 500 mm$\phi$×60 mm by being held for one hour at 1800° C. under a pressure of 3 kg/cm$^2$ in an $N_2$ atmosphere. A multiplicity of turbidity points (foreign matters) remained in the ingot.

EXPERIMENTAL EXAMPLE 2

An ingot was prepared in a similar manner to that in Example 1 except for using an oxyhydrogen flame by the Verneuil method and setting gas conditions in which $H_2$ was 300 L/min and $O_2$ was 150 L/min. A multiplicity of turbidity points (foreign matters) remained in the ingot.

EXPERIMENTAL EXAMPLE 3

An ingot prepared in a similar manner to that in Example 1 was set in a heating treatment furnace and, then, formed to be 500 mm$\phi$×60 mm by being held for one hour at 1800° C. under a pressure of 1 kg/cm$^2$ in an $N_2$ atmosphere. A multiplicity of bubbles of about $\phi$0.5 mm to about $\phi$1.0 mm remained in the ingot.

What is claimed is:

1. A quartz glass used for a plasma reaction apparatus for producing a semiconductor, said quartz glass containing 0.1 to 20 wt % in total of two or more types of metallic elements, said metallic elements comprising a first metallic element having at least one type of metallic element selected from Group 3B of the periodic table and a second metallic element having at least one type of metallic element selected from the group consisting of Sc, Y, Ti, Zr, Hf, lanthanoids, and actinoids wherein each metallic element of said second metallic elements has a maximum concentration of 2.0 wt % or less.

2. The quartz glass according to claim 1, wherein said second metallic element has two or more types of metallic elements.

3. Ihe quartz glass according to claim 1, wherein said second metallic elements has a total concentration of 2.0 wt % or more.

4. The quartz glass according to claim 1, wherein said first metallic element is Al, and said second metallic element comprises at least one type of metallic element selected from the group consisting of Y, La, Ce, Nd, Sm, and Gd.

5. The quartz glass according to claim 1, wherein the blend ratio of said first metallic element (M1) and the total of one or two types or more of said second metallic element (M2), (M1)/(M2), in atomic number ratio, is in a range of from 0.1 to20.

6. The quartz glass according to claim 1, which comprises a total content of bubbles and foreign matter of less than 100 mm$^2$ per 100 cm$^3$ area.

7. A quartz glass containing 0.1 to 20 wt % in total of two or more types of metallic elements, said metallic elements comprising a first metallic element having at least one type of metallic element selected from Group 3B of the periodic table and a second metallic element having at least one type of metallic element selected from the group consisting of Mg, Ca, Sr, Ba Sc, Y, Ti, Zr, Hf, lanthanoids, and actinoids, wherein each metallic element of said second metallic element has a maximum concentration of 2.0 wt % or less, wherein said quartz glass is manufactured by a Verneuil method comprising the steps of supplying a powder raw material prepared by mixing quartz powder with the powders of said first and second metallic elements or the powder of the compound thereof to a burner, and in case of dropping a hot-molten product to produce a quartz glass ingot, heating the surface temperature of said quartz glass ingot to 1800° C. or higher.

* * * * *